Jan. 3, 1933.  W. O. BRASSERT  1,892,864
CONCRETE SILO WALL MEMBER
Filed Jan. 12, 1931
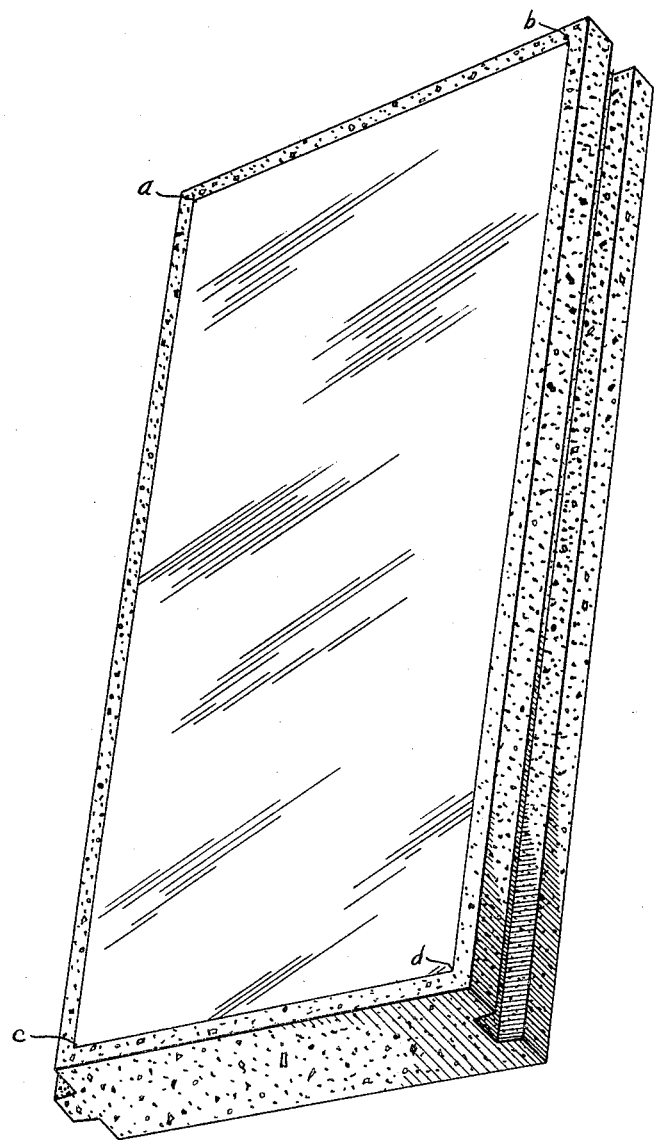
Inventor
Walter O. Brassert,
By Minturn & Minturn,
Attorneys.

Patented Jan. 3, 1933

1,892,864

UNITED STATES PATENT OFFICE

WALTER O. BRASSERT, OF KALAMAZOO, MICHIGAN

CONCRETE SILO WALL MEMBER

Application filed January 12, 1931. Serial No. 508,108.

It is desirable in silo construction to utilize concrete in the manufacture of slabs and blocks because of the inherent strength and convenience and economy of construction. However, due to the absorbent nature of this product the ensilage next to a concrete wall is more or less deprived of moisture needed in its proper curing and fermentation; also because the acid and sugar content of the ensilage juices which react chemically with the cement in the concrete cause decomposition and gradual destruction of the wall it is desirable to waterproof the interior wall of concrete silos. This has been attempted by plastering of the inside of silos but the acids and sugars cause the plaster to soften and disintegrate.

Attempts to apply a coating of asphalt or paraffin which are not affected by ensilage have failed or proved impractical. Asphalt paints do not form a permanent bond with the concrete and peel off, or the asphalt comes off with the ensilage to which it adheres. Paraffin, necessarily dissolved in gasoline or similar inflammable solvents, cannot be used because of the danger to the operator. Furthermore the joints between cement silo blocks must be filled with cement which would not properly cure in the presence of paraffin solution or asphalt paint and it would be commercially impractical for the silo constructors to first fill the joints with cement and wait around for a day or more for the cement in the joints to cure and harden before applying the spray or paint.

The object of this invention is to infuse the inside surface of the concrete slabs or blocks with paraffin or asphalt or other waxy or bituminous substances at the factory before they are shipped, so that there could never be a separation through abrasion or lack of bond.

A further object is to leave the edges of the finished slabs or blocks without paraffin or asphalt so they can bond with the cement which is forced into the joints to make a continuous wall.

Such a block is illustrated in perspective in the accompanying drawing in which the area $a, b, c, d$ represents the major portion of the inner side of a concrete silo block treated with paraffin and in which the paraffin in the margin outside of such area has been removed by heat.

In my preferred method a preformed concrete slab or block is first placed on a hot iron plate to drive the moisture out of the surface and heat the block so the paraffin will penetrate it readily. Then the block is moved into a shallow pan containing just enough melted paraffin to immerse the block to a depth of about one half inch. Next, the block is moved up a heated ramp where the adhering drops or lumps of paraffin are melted and flow back into the pan.

The block is then moved over a pair of parallel rails with angular channels receiving the corners of the block. The rails are heated sufficiently to drive the paraffin out of the edges and sides of the block next to the rails by melting and distillation, leaving the concrete exposed there the same as it was before the paraffin was applied. The block is next moved at right angles over another pair of angular heated tracks which drive the paraffin out of the two other sides and edges of the block, leaving it as indicated in the drawing. This method is fully described and claimed in my copending application, Serial No. 508,107.

I am aware that the desired result may be otherwise secured and I therefore do not desire to be limited any more than is required by the appended claims.

I claim:

1. A concrete silo wall member having its inside surface infused with an ensilage moisture resistant, except at its marginal areas where contacted by a joint-closing material.

2. A concrete silo wall member having its inside surface proofed against absorption of ensilage moisture except where contacted by a joint-closing material.

3. A concrete silo wall member having its inside surface proofed by paraffin against absorption of ensilage moisture except at its marginal areas where contacted by a joint-closing material.

4. A concrete silo wall member having its inside surface proofed by asphalt against absorption of ensilage moisture except at its marginal areas where contacted by a joint-closing material.

5. A concrete silo wall member having its inside surface infused with an ensilage moisture resistant which resistant is driven below the surface at areas where joint-closing cement is used.

In testimony whereof I affix my signature.

WALTER O. BRASSERT.